Aug. 7, 1962     F. B. HUNTER     3,048,188
RELIEF VALVE
Filed Oct. 29, 1957
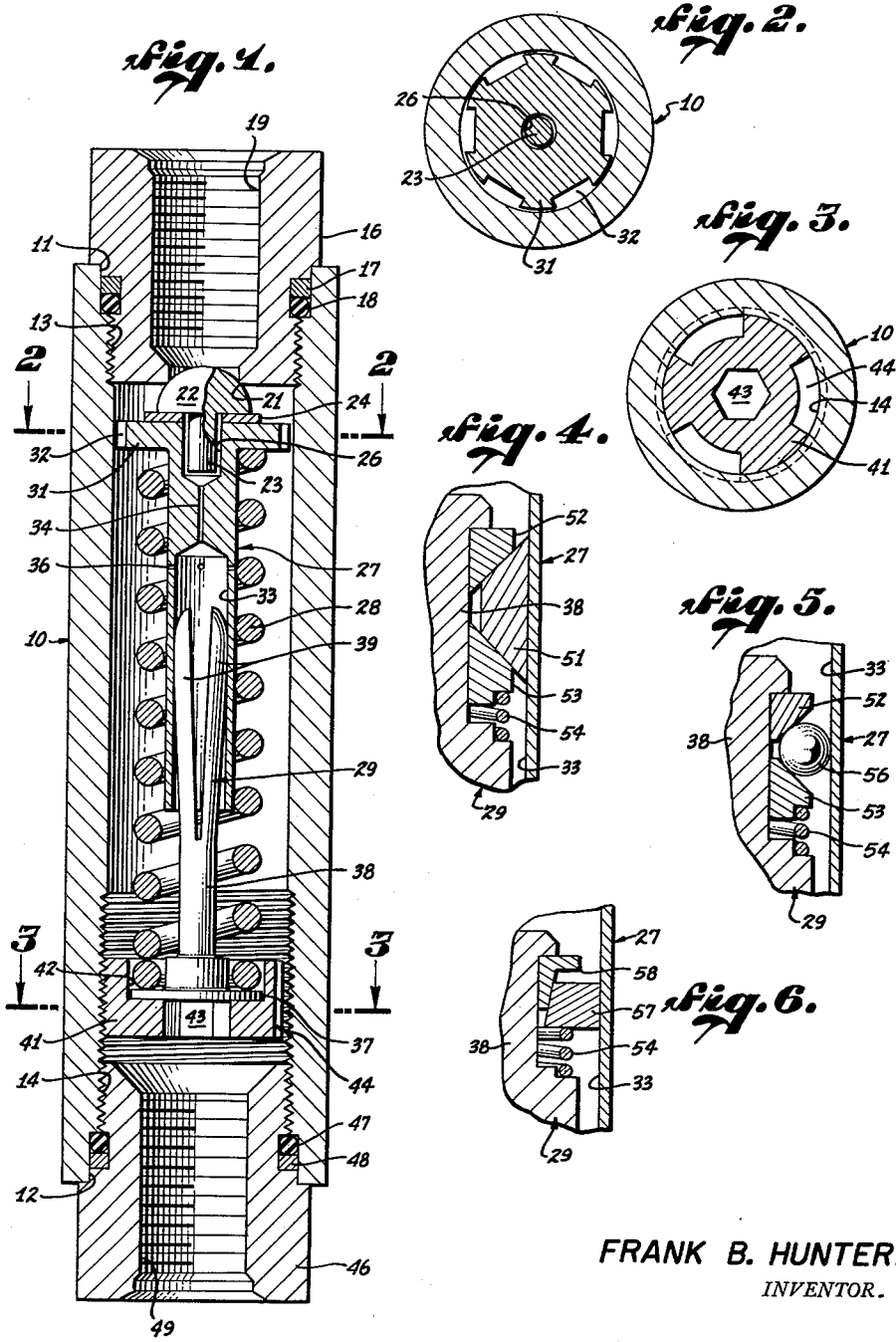
FRANK B. HUNTER,
INVENTOR.
HERZIG & JESSUP,
ATTORNEYS.
BY

United States Patent Office 3,048,188
Patented Aug. 7, 1962

3,048,188
RELIEF VALVE
Frank B. Hunter, Van Nuys, Calif.
(5667 Lubao St., Los Angeles, Calif.)
Filed Oct. 29, 1957, Ser. No. 693,052
1 Claim. (Cl. 137—469)

The present invention relates to a hydraulic relief valve, and particularly to a relief valve equipped with a damper for the reduction of hydraulic pressure variations.

It is an important object of my invention to provide a relief valve actuated by both a primary and a secondary pressure drop for increased opening of the valve by small increments of increased flow so that there is a minimum difference between the full flow pressure and the closing pressure.

Another object is to provide a spring-loaded relief valve, damped against hydraulic pressure changes, and wherein the valve element is completely self-aligning.

A further object is to provide a friction-damped relief valve capable of rapid action and uniform hydraulic pressure control with a minimum of hydraulic fluid bleeding past the valve.

Additional objects will become apparent from the following description.

Broadly stated, my invention consists of a relief valve comprising a valve member provided with a surface of spherical curvature for seating in a seat member. A transverse member loosely carries the valve member so that it can move laterally and self-align itself in the seat member. The transverse member is provided with fluid passages for restricting fluid flow into the interior of the valve body, and thus developing a secondary pressure drop between the exterior and interior of the valve body. A tubular stem is connected to the transverse member and disposed longitudinally in the interior of the valve body. A generally solid stem also is disposed longitudinally in the interior of the body to extend into the tubular portion of the tubular stem and frictionally engage the inside walls of the tubular stem to damp the opening and closing movements of the valve member. The functioning of the valve member is regulated by a loaded spring disposed around the two stems to urge the valve member into seating engagement with the valve seat member.

A more detailed description of specific embodiments of the invention is given with reference to the drawing, wherein:

FIGURE 1 is a cross-sectional elevational view showing the relationship of the various elements of the valve;

FIGURE 2 is a cross-sectional view taken on the line 2—2 of FIGURE 1;

FIGURE 3 is a cross-sectional view taken on the line 3—3 of FIGURE 1;

FIGURE 4 is a fragmentary cross-sectional elevational view showing a modified design of a friction-damping assembly;

FIGURE 5 is a similar view showing another modified design of a friction-damping assembly; and FIGURE 6 is a similar view showing still another modified design of a friction-damping assembly.

In the specific embodiment shown in FIGURES 1 to 3 of the drawings, a tubular body 10 is provided with counterbored portions 11 and 12 and internally threaded sections 13 and 14 at the ends thereof, as shown in FIGURE 1. An externally threaded seat cap and fitting unit 16, carrying a packing ring 17 and a back-up ring 18, is tightly screwed into portion 13 in the end of body 10. The unit 16 is provided with an internal thread 19 for engaging a threaded fitting. At the inner end of the bore formed by internal thread 19 there is formed a seat 21 adapted to seat a hemi-spherical poppet valve 22 fixed on a stem 23. Press-fitted around the inner end of stem 23 against the base of the poppet valve 22 is a thrust washer 24. The stem 23 fits loosely in a hole 26 in the outer end of a restrictor-damper 27 to be laterally or radially slidable by washer 24 so that valve 22 is completely self-aligning in seat 21.

A helical compression spring 28 is disposed inside body 10 around restrictor-damper 27 and a plunger-damper 29 slidably fitted in the restrictor-damper, as shown in FIGURE 1. The restrictor-damper 27 is provided with a circular flange 31 at the outer end thereof. Flange 31 fits loosely inside body 10 and has peripheral grooves or channels 32 cut axially through the flange. A concentric cylindrical bore 33 is formed in the restrictor-damper 27 to extend from the inner end to somewhat beyond the mid-point thereof. The bore 33 communicates with hole 26 through an axial vent hole 34 and with the interior of body 10 through radial vent holes 36.

The plunger-damper 29 is provided with a piston or flange 37 at the outer end of a stem 38 split axially into two prongs 39. The prongs 39 are spread apart so that their polished outer surfaces frictionally and slidably engage the polished inner walls of bore 33 of restrictor-damper 27 to produce a desired damping effect in the valve. The prongs 39 are urged into bore 33 by an adjustment screw 41 provided with a concentric cylindrical hole 42 to accommodate piston 37 and a recessed drive 43, for a socket wrench. The drive 43 opens into the cylindrical hole 42 to form a continuous passage through the screw 41. Screw 41 also is provided with peripheral grooves or passages 44 establishing communication between the portions of the interior of threaded section 14 of body 10 at each side of the screw. The desired degree of compression in spring 28 is achieved by the relative position of adjustment screw 41 with respect to the adjacent end of body 10. The extent to which spring 28 is compressed determines the magnitude of the load continuously applied to poppet valve 22 and piston 37.

An externally threaded fitting 46 carrying a packing ring 47 and a back-up ring 48 is tightly screwed into the end of threaded section 14. The fitting 46 is provided with an internal thread 49 for engaging a conduit to communicate with the interior of threaded section 14.

In operation, hydraulic pressure of the hydraulic system acts on poppet valve 22. When this pressure exceeds that applied to valve 22 in the opposite direction by compression spring 28, the spring is compressed, valve 22 is unseated from seat 21 and hydraulic fluid escapes between the seat 21 and the valve 22 into the interior of the body 10 adjacent valve 22, then into the main internal cavity of body 10 through flow-restricting channels 32 and out through channels 44 and fitting 46. The flow-restricting action of channels 32 generates an additional increment of hydraulic pressure which acts against the outer surface of flange 31 of restrictor-damper 27 and additionally compresses the spring 28. This additional compression causes a wider opening of valve 22 and an increased flow of hydraulic fluid through the valve. It will be seen that this feature of the valve results in a greater opening of valve 22 for given relatively small increments of increased fluid flow and thus maintains the full flow pressure of the valve nearer to the valve opening and closing pressures.

In conventional hydraulic relief valves the closing pressure is specified to be within about 82 percent of the full flow pressure. Valves made in accordance with the instant invention have exhibited closing pressures that were within about 95 percent of their full flow pressures at about twice the specified volume of flow for the particular size valve. By virtue of the design and construction of the valve of the invention, the difference between the full flow pressure and the closing pressure can be controlled independently of normal variations from one assembled valve to another. This feature is important in the mass production of relief valves.

In summary, the first hydraulic pressure drop in the initially opened valve 22 is the drop from the system pressure acting on the outside of valve 22 to the inside of body 10, adjacent the valve 22, and the outside surface of flange 31. The fluid passages through channels 32 are designed to restrict the flow of fluid into the main internal cavity of body 10 through channels 32 to cause an increased secondary pressure to act on the outside surface of flange 31 as compared to the return hydraulic pressure in the main internal cavity of body 10. This increased secondary pressure additionally opens the valve 22 and increases the fluid flow through the valve. The balancing of these hydraulic pressures acting on restrictor-damper 27, at the desired rate of full fluid flow, is accomplished by properly loading the coil spring 28 by adjustment screw 41. Thus the hydraulic pressure is controlled in the system with sudden response, minimum variation between full flow and closing pressures, minimum bleeding and amid pressures damped conditions.

In the specific modifications of the plunger-damper 29 shown in FIGURES 4 to 6, the prongs 39 are replaced by frictional elements of different designs. In the embodiment shown in FIGURE 4, a split ring 51 with inclined sides is shown slidably contacting the inclined sides of circular skids 52 and 53 carried on the stem 38. Skid 53 is axially slidable on stem 38 and is urged by helical spring 54 toward skid 52 fixed adjacent the end of stem 38. This action of spring 54 urges the smooth, outer surface of ring 51 into predetermined, sliding, frictional contact with the smooth inner surface of the bore 33 in restrictor-damper 27. The embodiment shown in FIGURE 5 is similar to that shown in FIGURE 4 but differs therefrom in that a series of balls 56 is used, instead of split ring 51, to produce the predetermined frictional contact. In the embodiment shown in FIGURE 6 the frictional contact is produced by a split ring 57 having only one inclined surface. The inclined surface of the split ring is urged into sliding contact with the inclined surface of a skid 58 fixed adjacent the end of stem 38. Other variations of frictional elements will occur to one skilled in the art.

The foregoing description is explanatory only, and is given primarily to illustrate specific embodiments of my invention. It is understood that many variations in the structure, design and details of the relief valve described above will occur to one skilled in the art. Accordingly, it is understood that such changes and modifications in the structure, design and details of the specific embodiments of my invention illustrated and described above may be made within the scope of the appended claim without departing from the spirit of the invention.

I claim:

A hydraulic relief valve comprising a cylindrical body, an internally threaded fitting screwed into one end of the body, a circular valve seat adjacent the inner end of the internal thread of the fitting, a valve provided with a surface of spherical curvature for seating in the valve seat, a circular flange transversely disposed in the body and loosely carrying the valve for radical movement and self alignment thereof in the seat, the flange being provided with hydraulic fluid channels for restricting fluid flow therethrough and providing a secondary pressure drop between the valve and the interior of the body, a tubular stem axially disposed in the body and connected to the circular flange, a coaxially disposed stem provided with prongs extending into the tubular portion of the tubular stem and adapted to frictionally engage the inside walls of the tubular stem for damping the opening and closing movements of the valve, screw-threaded means adapted for threading into the end of the valve adjacent the second-mentioned stem and limiting the outward movement of said stem, a loaded coil spring disposed coaxially around the two stems for urging the valve into seating engagement with the valve seat, and means for withdrawing exhaust fluid from the interior of the body.

References Cited in the file of this patent

UNITED STATES PATENTS

| 487,029 | Gray | Nov. 29, 1892 |
| 1,939,128 | Meyer | Dec. 12, 1933 |
| 2,042,216 | Edwards | May 26, 1936 |
| 2,162,898 | Rotter | June 20, 1939 |
| 2,672,881 | Jay | Mar. 23, 1954 |
| 2,714,392 | Mercier | Aug. 2, 1955 |
| 2,740,425 | Garland | Apr. 3, 1956 |
| 2,754,841 | Eddy | July 17, 1956 |

FOREIGN PATENTS

| 577,825 | Great Britain | June 3, 1946 |